(12) United States Patent
Prater, Jr. et al.

(10) Patent No.: US 10,107,900 B1
(45) Date of Patent: Oct. 23, 2018

(54) SYSTEM FOR CALCULATING DISPLACEMENT OF A SONAR ARRAY

(71) Applicants: James L. Prater, Jr., Panama City, FL (US); Jose E. Fernandez, Panama City, FL (US)

(72) Inventors: James L. Prater, Jr., Panama City, FL (US); Jose E. Fernandez, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 203 days.

(21) Appl. No.: 15/364,468

(22) Filed: Nov. 30, 2016

(51) Int. Cl.
*G01S 7/52* (2006.01)
*G01S 15/89* (2006.01)
*G01H 5/00* (2006.01)

(52) U.S. Cl.
CPC .......... *G01S 7/52004* (2013.01); *G01H 5/00* (2013.01); *G01S 15/89* (2013.01)

(58) Field of Classification Search
CPC ........ G01S 7/52004; G01S 15/89; G01H 5/00
See application file for complete search history.

(56) References Cited

U.S. PATENT DOCUMENTS 8,159,387 B1 * 4/2012 Fernandez .............. G01S 15/46
367/127

OTHER PUBLICATIONS

Sternlicht et al.; Advanced sonar technologies for high clearance rate mine countermeasures; 2016; pp. 1-8. (Year: 2016).*

* cited by examiner

*Primary Examiner* — Daniel Pihulic
(74) *Attorney, Agent, or Firm* — James T. Shepherd

(57) ABSTRACT

A computer apparatus determines a highly accurate displacement of a sonar array in real time using multiple processors and data objects. The processors receive multiple sonar pings from a sonar array, instantiate the quasi-unique sonar objects, beamform, and update the objects using time-delay functions. Each object includes properties such as a time of flight value associated with a first ping, time-delay values associated with a second ping, a speed of sound value associated with the pair of consecutive pings, a sonar beam angle value associated with the first ping, and the displacement value. Processing code in each object utilize these properties to update the displacement value and provide it for SAS imaging.

19 Claims, 1 Drawing Sheet

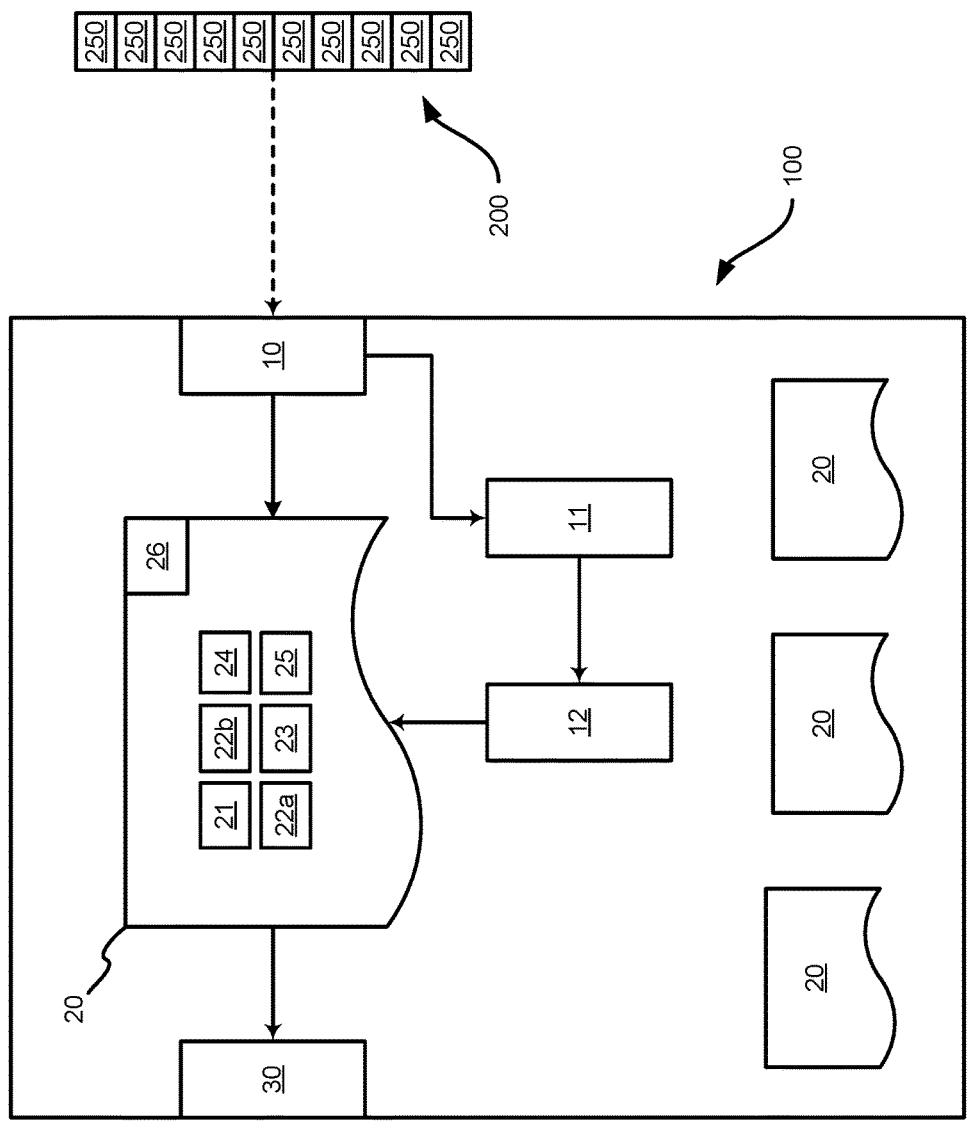

SYSTEM FOR CALCULATING DISPLACEMENT OF A SONAR ARRAY

STATEMENT OF GOVERNMENT INTEREST

The invention described herein may be manufactured and used by or for the Government of the United States of America for Governmental purposes without the payment of any royalties.

FIELD OF INVENTION

This invention relates to the field of processing synthetic aperture sonar and more specifically to using synthetic aperture sonar to calculate the displacement of an object.

BACKGROUND OF THE INVENTION

Sonar imaging systems use a technology referred to as synthetic aperture sonar (SAS). Sonar imaging systems utilize an assembly of sonar transducers, called an array, which transmit and receive acoustic pulses called "pings." The array mounts to a mobile platform, such as a submarine. Movement of this platform results in the array moving along a line called a track. SAS systems combine the results of multiple pings transmitted from an array at different times to form a high-resolution image. Summing these pings using a beamforming technique allows production of the image. To ensure image accuracy, the SAS system must have a value for array displacement along the track between pings.

It is a problem known in the art that SAS systems may be inaccurate due to a lack of ability to determine displacement along the track because the platform is controlled separately. Since SAS systems use displacement compensation algorithms to adjust for the movement of the array when producing the image, such displacement values are critical to ensure quality of the image. The system must perform these adjustments in real time to allow real time display of the images. Currently, the position can only be estimated in two dimensions, limiting the accuracy of the SAS image. Furthermore, SAS systems require accurate speed of sound measurements to use beamforming techniques. Current SAS systems assume a speed of sound based on previous data, but cannot simulate a speed of sound to evaluate the accuracy of these assumptions.

There is an unmet need in the art for highly accurate methods of calculating the displacement of an array and incorporating this critical data into SAS imaging.

There is a further unmet need in the art for an SAS system capable of processing simulated data to ensure the accuracy of an assumed speed of sound.

BRIEF SUMMARY OF THE INVENTION

The present invention is a computer apparatus for determining a highly accurate displacement of a sonar array in real time. Processors receive multiple sonar pings from a sonar array, instantiate the quasi-unique sonar objects, beamform, and update the objects using time-delay functions. Each object includes properties such as a time of flight value associated with a first ping, time-delay values associated with a second ping, a speed of sound value associated with the pair of consecutive pings, a sonar beam angle value associated with the first ping, and the displacement value. Processing code in each object utilize these properties to update the displacement value and provide it for SAS imaging.

BRIEF DESCRIPTION OF SEVERAL VIEWS OF THE DRAWING(S)

FIG. 1 illustrates an exemplary embodiment of a computer apparatus for determining a highly accurate displacement of a sonar array in real time.

TERMS OF ART

As used herein, the term "configured" refers to software which physically causes a single computer processor to perform multiple processing functions concurrently to operate as multiple computers, or modified functionality and modified resource allocation (e.g., programmed with software or circuitry to perform an action).

As used herein, the term "function" refers to any set of computer instructions or segment of code that causes or modifies signals, circuitry, and resources to operate as a separate processing component.

As used herein, the term "object" refers to a software implementation of data storage and processing functions which perform a discrete function of a computer processor or machine.

As used herein, the term "ping" refers to an acoustic pulse or data received from such a pulse.

As used herein, the term "processor" refers to any code segment, circuitry or computer system or other apparatus capable of performing a logical, mathematical, or functional operation and/or transforming the type, state, value, or condition of an actual or modeled entity.

As used herein, the term "processing code" refers to any code segment capable of performing a logical, mathematical, or functional operation and/or transforming the type, state, value, or condition of an actual or modeled entity.

As used herein, the term "real time" refers to data which is processed by a system at the same rate as it is received.

As used herein, the term "squinting" refers to beamforming at an angle that is not perpendicular to the sonar array.

As used herein, the term "static" refers to data or a state which does not change during a process or processing session. Static values may or may not be programmed as non-modifiable instructions or otherwise encoded into computer circuitry.

As used herein, the term "values" refers to values that express the condition, state or quantity of stored data or properties. Values may include time of flight, time-delay due to movement, speed of sound, sonar beam angle, and displacement.

DETAILED DESCRIPTION OF THE INVENTION

FIG. 1 illustrates an exemplary embodiment of computer apparatus 100 for determining a highly accurate displacement of sonar array 200 in real time. Apparatus 100 includes a listening processor 10 configured to receive a pair of consecutive pings including a first ping and a second ping from sonar array 200, and to instantiate a quasi-unique sonar object 20. Because sonar systems may transmit pings at high rates, this results in the instantiation of numerous quasi-unique sonar objects 20.

Apparatus 100 also includes a beamforming processor 11 configured to perform a beamforming function in real time and a cross-correlation processor 12 configured to perform a time delay function in real time. Optionally, apparatus 100 also includes an interface 30 configured to transmit at least one quasi-unique sonar object 20 or a property of quasi-unique sonar object 20 to an operating system to create an image.

Quasi-unique sonar objects 20 include multiple properties, including a time of flight value 21 associated with the first ping, time-delay values 22a and 22b associated with the second ping, a speed of sound value 23 associated with the pair of consecutive pings, sonar beam angle value 24 associated with the first ping, and a displacement value 25. Quasi-unique sonar objects 20 also include processing code 26 configured to update displacement value 25 in real time.

Time-delay values 22a and 22b can include a forward time delay value 22a and an aft time delay value 22b. Speed of sound value 23 may be a measured speed of sound value or an assumed speed of sound value. Sonar beam angle value 24 may be a predetermined sonar beam angle value or an intended sonar beam angle value. Assumed speed of sound and intended sonar beam angle values may be used to model or test behavior of an SAS system under theoretical conditions or to attempt to deduce an optimum speed of sound value 23 or sonar beam angle value 24 for a particular application. Sonar beam angle value 24 may be static or may be modified by a user.

In one embodiment, the displacement function is a track displacement function utilizing the following equation:

$$\Delta x = \frac{c(2t + \tau_a + \tau_f)(\tau_a - \tau_f)}{8t(\sin\theta)}$$

where $\Delta x$ is displacement value 25, c is speed of sound value 23 that is a measured speed of sound value, t is time of flight value 21, $\tau_a$ is aft time delay value 22b, $\tau_f$ is forward time delay value 22a, and $\theta$ is sonar beam angle value 24 that is a predetermined sonar beam angle value.

In another embodiment, the displacement function is an assumed displacement function utilizing the following equation:

$$\Delta x = \frac{c(2t + \tau_a + \tau_f)(\tau_a - \tau_f)}{2t(\sin\theta)}$$

where $\Delta x$ is displacement value 25, c is speed of sound value 23 that is an assumed speed of sound value, t is time of flight value 21, $\tau_a$ is aft time delay value 22b, $\tau_f$ is forward time delay value 22a, and $\theta$ is sonar beam angle value 24 that is an intended sonar beam angle value.

During operation, beamforming processor 11 receives a plurality of ping values from listening processor 10. The beamforming function sums ping values to create a pulse beam and squints the pulse beam by a sonar beam angle value 24 to calculate beam pair values. Beam pair values can include a forward beam pair value including a first forward reflection time $R_{f1}$ and a second forward reflection time $R_{f2}$, and an aft beam pair value including a first aft reflection time $R_{a1}$ and a second aft reflection time $R_{a2}$.

Beam pair values pass to cross-correlation processor 12. The time delay function can then update time-delay values 22a and 22b using the equation:

$$\tau = (R_2 - R_1)$$

where $\tau$ is time-delay value 22a or 22b, $R_1$ is a first reflection time, and $R_2$ is a second reflection time. In embodiments where time-delay values 22a and 22b are forward time delay value 22a and aft time delay value 22b, time delay function calculates forward time delay value 22a using first forward reflection time $R_{f1}$ and second forward reflection time $R_{f2}$, respectively, and calculates aft time delay value 22b using first aft reflection time $R_{a1}$ and second aft reflection time $R_{a2}$, respectively.

Sonar array 200 includes at least three sonar elements 250. Sonar elements 250 are configured to emit a first ping at a first time, and to emit a second ping at a second time. At least two of sonar elements 250 occupy the same spatial position at the second time as at least two other sonar elements 250 occupy at the first time. This overlap between sonar elements 250 ensures accurate estimation of movement of sonar array 200.

It will be understood that many additional changes in the details, materials, procedures and arrangement of parts, which have been herein described and illustrated to explain the nature of the invention, may be made by those skilled in the art within the principle and scope of the invention as expressed in the appended claims. It should be further understood that the drawings are not necessarily to scale; instead, emphasis has been placed upon illustrating the principles of the invention.

What is claimed is:

1. A computer apparatus for determining a highly accurate displacement in real time comprised of:
   a listening processor configured to receive a pair of consecutive pings including a first ping and a second ping, and to instantiate a quasi-unique sonar object;
   a beamforming processor configured to perform a beamforming function in real time;
   a cross-correlation processor configured to perform a time delay function in real time; and
   a plurality of quasi-unique sonar objects, wherein each of said quasi-unique sonar objects includes:
     a plurality of properties including a time of flight value associated with said first ping, a plurality of time-delay values associated with said second ping, a speed of sound value associated with said pair of consecutive pings, a sonar beam angle value associated with said first ping, and a displacement value, and
     processing code configured to update said displacement value in real time.

2. The computer apparatus of claim 1, further comprising an interface configured to transmit at least one of said plurality of quasi-unique sonar objects or at least one of said plurality of properties to an operating system to create an image.

3. The computer apparatus of claim 1, wherein said plurality of time-delay values include a forward time delay value and an aft time delay value.

4. The computer apparatus of claim 3, wherein said speed of sound value is a measured speed of sound value.

5. The computer apparatus of claim 4, wherein said sonar beam angle value is a predetermined sonar beam angle value.

6. The computer apparatus of claim 5, wherein said sonar beam angle value is static.

7. The computer apparatus of claim 5, wherein said sonar beam angle value may be modified by a user.

8. The computer apparatus of claim 5, wherein said displacement function updates said displacement value using the equation:

$$\Delta x = \frac{c(2t + \tau_a + \tau_f)(\tau_a - \tau_f)}{8t(\sin\theta)}$$

where $\Delta x$ is said displacement value, c is said measured speed of sound value, t is said time of flight value, $\tau_a$ is said aft time delay value, $\tau_f$ is said forward time delay value, and $\theta$ is said predetermined sonar beam angle value.

9. The computer apparatus of claim 3, wherein said speed of sound value is an assumed speed of sound value.

10. The computer apparatus of claim 9, wherein said sonar beam angle value is an intended sonar beam angle value.

11. The computer apparatus of claim 10, wherein said displacement function updates said displacement value using the equation:

$$\Delta x = \frac{c(2t + \tau_a + \tau_f)(\tau_a - \tau_f)}{2t(\sin\theta)}$$

where $\Delta x$ is said displacement value, c is said assumed speed of sound value, t is said time of flight value, $\tau_a$ is said aft time delay value, $\tau_f$ is said forward time delay value, and $\theta$ is said intended sonar beam angle value.

12. The computer apparatus of claim 1, wherein said beamforming processor receives a plurality of ping values from said listening processor.

13. The computer apparatus of claim 12, wherein said beamforming function includes summing said plurality of ping values to create a pulse beam and squinting said pulse beam by said sonar beam angle value to calculate a plurality of beam pair values.

14. The computer apparatus of claim 13, wherein said plurality of beam pair values includes a forward beam pair value including a first forward reflection time $R_{f1}$ and a second forward reflection time $R_{f2}$, and an aft beam pair value including a first aft reflection time $R_{a1}$ and a second aft reflection time $R_{a2}$.

15. The computer apparatus of claim 13, wherein said time delay function updates said plurality of time-delay values using the equation:

$$\tau = (R_2 - R_1)$$

where $\tau$ is one of said plurality of time-delay values, $R_1$ is a first reflection time, and $R_2$ is a second reflection time.

16. A sonar system comprised of:
a sonar array comprised of a plurality of sonar elements; and
a computer apparatus for determining a highly accurate displacement in real time comprised of:
  a listening processor configured to receive a pair of consecutive pings including a first ping and a second ping, and to instantiate a quasi-unique sonar object,
  a beamforming processor configured to perform a beamforming function in real time,
  a cross-correlation processor configured to perform a time delay function in real time,
  a plurality of quasi-unique sonar objects, wherein each of said quasi-unique sonar objects includes:
    a plurality of properties including a time of flight value associated with said first ping, a plurality of time-delay values associated with said second ping, a speed of sound value associated with said pair of consecutive pings, a sonar beam angle value associated with said first ping, and a displacement value, and
    processing code configured to update said displacement value in real time.

17. The system of claim 16, wherein said plurality of sonar elements comprises at least three sonar elements.

18. The system of claim 16, wherein said plurality of sonar elements are configured to emit a first ping at a first time, and to emit a second ping at a second time.

19. The system of claim 18, wherein at least two of said plurality of sonar elements occupy the same spatial position at said second time as at least two other of said plurality of sonar elements occupy at said first time.

* * * * *